United States Patent [19]

Scholl et al.

[11] Patent Number: 5,124,370
[45] Date of Patent: Jun. 23, 1992

[54] POLYISOCYANATE MIXTURES CONTAINING ISOCYANURATE GROUPS, A PROCESS FOR THEIR PRODUCTION AND THEIR USE FOR THE PRODUCTION OF POLYURETHANE FOAMS

[75] Inventors: Hans J. Scholl, Cologne; Rainer Welte, Leverkusen; Günter Gleitsmann, Krefeld, all of Fed. Rep. of Germany

[73] Assignee: Bayer Aktiengesellschaft, Leverkusen, Fed. Rep. of Germany

[21] Appl. No.: 745,585

[22] Filed: Aug. 15, 1991

[30] Foreign Application Priority Data

Aug. 22, 1990 [DE] Fed. Rep. of Germany ....... 4026474

[51] Int. Cl.[5] ............................................. C08G 18/77
[52] U.S. Cl. ................................... 521/161; 521/159; 521/902; 544/221; 252/182.21; 252/182.22; 252/182.23
[58] Field of Search ........................ 252/182.21, 182.22, 252/182.23; 544/221; 521/159, 161, 902

[56] References Cited

U.S. PATENT DOCUMENTS

| | | | |
|---|---|---|---|
| 3,487,080 | 12/1969 | Maisui et al. | 260/248 |
| 3,960,788 | 6/1976 | Cascurida et al. | 521/902 |
| 4,115,373 | 9/1978 | Henes et al. | 528/48 |
| 4,382,125 | 5/1983 | Narayan et al. | 521/161 |
| 4,597,909 | 7/1986 | Keggenhoff et al. | 560/347 |

*Primary Examiner*—Maurice J. Welsh
*Assistant Examiner*—Rachel Johnson
*Attorney, Agent, or Firm*—Joseph C. Gil; Godfried R. Akorli

[57] ABSTRACT

Disclosed herein are liquid polyisocyanate mixtures containing isocyanurate groups and having an NCO content of 15 to 30% by weight obtainable by partial trimerization of the isocyanate groups of polyisocyanate mixtures of the diphenyl methane series containing 80 to 100% by weight diisocyanatodiphenyl methane isomers and 0 to 20% by weight higher than difunctional polyisocyanates of the diphenyl methane series, 40 to 80% by weight of the diisocyanatodiphenyl methane isomers consisting of 4,4'-diisocyanatodiphenyl methane, 20 to 60% by weight of 2,4'-diisocyanatodiphenyl methane and 0 to 8% by weight of 2,2'-diisocyanatodiphenyl methane and the percentages shown adding up to 100.

6 Claims, No Drawings

POLYISOCYANATE MIXTURES CONTAINING ISOCYANURATE GROUPS, A PROCESS FOR THEIR PRODUCTION AND THEIR USE FOR THE PRODUCTION OF POLYURETHANE FOAMS

BACKGROUND OF THE INVENTION

This invention relates to new liquid polyisocyanate mixtures containing isocyanurate groups and, optionally containing less than the equivalent number of urethane groups based on polyisocyanate mixtures of the diphenyl methane series. The invention also relates to a process for the production of these polyisocyanate mixtures and to their use in the production of polyurethane foams.

There are many known processes for the trimerization of organic isocyanates which yield isocyanurates (see J. H. Saunders and K. C. Frisch, Polyurethanes, Chemistry and Technology, pages 94 et seq (1962)). Suitable trimerization catalysts are strong organic bases, including for example metal phenolates having an alkaline effect, alkali metal carbonates, tertiary amines, tertiary phosphines and the "onium" compounds of nitrogen and phosphorus and also basic heterocycles of these elements.

The use of quarternary ammonium hydroxides as catalysts for the trimerization of isocyanate groups has been described on several occasions. According to JP-PS 601,337 (U.S. Pat. No. 3,487,080), quarternary ammonium hydroxides are used together with certain co-catalysts; the examples thereof are relate, in particular, the partial trimerization of aromatic diisocyanates.

According to DE-AS 2,551,634, so-called "Mannich bases" may also be used, with advantage, for such partial trimerizations. According to DE-OS 3,827,596, catalysts of alkali fluorides and quarternary ammonium or phosphonium salts are also excellent trimerization agents.

In these publications, di- or polyisocyanate mixtures of the diphenyl methane series are also regularly mentioned in general terms as starting materials for the trimerization reaction. However, there are no specific examples of corresponding liquid, storable polyisocyanate mixtures containing isocyanurate groups. U.S. Pat. No. 3,487,080 (Table 3) refers merely to "gelation products" of "MDI" trimerizations for the purpose of documenting catalyst activities. The tendency of such starting isocyanates to become unstable in storage is known from the literature (Chem. So. Rev. 3/1974, page 227). Additions of catalyst can only increase this tendency so that instability (gel components, solid components) are inherent in these mixtures.

Accordingly, the problem addressed by the present invention was to provide polyisocyanate mixtures of the diphenyl methane series (MDI) which would be stable in storage and liquid, and which would contain isocyanurate groups.

It has now surprisingly been found that this problem can be solved by the polyisocyanate mixtures of the diphenyl methane series which are described in detail hereinafter.

SUMMARY OF THE INVENTION

The present invention relates to liquid polyisocyanate mixtures containing isocyanurate groups and having an NCO content of 15% to 30% by weight obtainable by partial trimerization of the isocyanate groups of polyisocyanate mixtures of the diphenyl methane series containing 80% to 100% by weight diisocyanato diphenyl methane isomers and 0% to 20% by weight higher than difunctional polyisocyanates of the diphenyl methane series, 40% to 80% by weight of the diisocyanato diphenyl methane isomers consisting of 4,4'-diisocyanato diphenyl methane, 20% to 60% by weight of 2,4'-diisocyanato diphenyl methane and 0% to 8% by weight of 2,2'-diisocyanatodiphenyl methane and the percentages shown adding up to 100.

Liquid isocyanurate polyisocyanate mixtures in which 0% to 50% of the isocyanate groups reacted off have been converted into urethane groups are preferred for the purpose of the invention.

The present invention also relates to a process for the production of the liquid polyisocyanate mixtures, characterized in that the isocyanate groups of a polyisocyanate mixture of the diphenyl methane series containing 80% to 100% by weight diisocyanato diphenyl methane isomers and 0% to 20% by weight higher than difunctional polyisocyanates of the diphenyl methane series, 40% to 80% by weight of the diisocyanatodiphenyl methane isomers consisting of 4,4'-diisocyanatodiphenyl methane, 20% to 60% by weight of 2,4'-diisocyanatodiphenyl methane and 0% to 8% by weight of 2,2'-diisocyanatodiphenyl methane and the percentages shown adding up to 100 which are partly trimerized to the particular degree of trimerization required, in the presence of a trimerization-accelerating catalyst and optionally in the presence of hydroxyl-functional components and the trimerization reaction is subsequently terminated by addition of a catalyst poison.

Finally, the present invention also relates to the use of the liquid polyisocyanate mixtures according to the invention for the production of polyurethane foams (with water as blowing agent) having improved strengths.

DETAILED DESCRIPTION OF THE INVENTION

In accordance with the invention, special polyisocyanate mixtures of the diphenyl methane series are employed as starting components. The useful polyisocyanate mixtures which have an increased content of 2,4'-diisocyanatodiphenyl methane, may be obtained, for example, by phosgenation of the corresponding polyamine mixtures which in turn may be directly obtained by aniline/formaldehyde condensation in accordance with DE-OS 3,407,494. If, desired, the 2,4'-diisocyanatodiphenyl methane content of the diisocyanate or polyisocyanate mixtures may also be increased by admixture with fractions enriched with 2,4'-diisocyanatodiphenyl methane, of the type obtainable as distillate in the partial distillation of phosgenation products of aniline/formaldehyde condensates.

The process according to the invention is carried out in the presence of typical trimerization catalysts, preferably in the presence of the above-mentioned Mannich bases or the above-mentioned catalysts of alkali fluorides and quarternary ammonium or phosphonium salts.

Hydroxyl-functional (preferably liquid) components may be introduced before the beginning of the trimerization reaction or during the addition of the catalyst in order to:

a) use so-called urethane co-catalysts for trimerization reactions, b) serve as solvent for trimerization catalysts.

Suitable hydroxyl-functional components are alcohols, such as methanol, ethanol, 2-ethyl-1-hexanol, 2-ethyl-hexane-1,3-diol or liquid polyols of the type described, for example, in Kunststoff-Handbuch, "Polyurethane", Vol. 7, edited by G. Oertel, pages 15–18 (Carl Hanser Verlag, Munchen 1983). Hydroxyl-functional liquids such as these are generally reacted in such quantities that 0% to 50% of the isocyanate groups which are reacted off are converted into urethane groups (urethanization).

The quantity of catalyst used depends upon the quality of the starting isocyanates. Accordingly, the particular quantity of catalyst required may be determined very easily in a preliminary test.

The process according to the invention may advantageously be carried out in the absence of solvents or even in the presence of inert solvents or diluents. Suitable inert solvents are apolar diluents, such as toluene, xylene, higher aromatic hydrocarbons, light gasoline, white spirit and $C_{12-20}$ alkyl sulfonic acid esters, and also inert polar solvents, such as esters and ketones, or mixtures of such solvents.

According to the invention, the trimerization reaction is generally carried out at a temperature in the range from 10° C. to 100° C. and preferably at a temperature in the range from 20° C. to 80° C. The optimum reaction temperature is determined by the type of starting polyisocyanates used and by the type of trimerization catalysts used and may be determined in a simile preliminary test.

As set forth herein, the liquid polyisocyanate mixtures containing isocyanurate groups and having an NCO content are obtained by partial trimerization of the isocyanate groups of the polyisocyanate mixture. The trimerization reaction is generally terminated on reaching a degree of trimerization (degree of trimerization = percentage of trimerized isocyanate groups, based on the total quantity of isocyanate groups present in the starting polyisocyanate) of 5 to 40 and preferably 10% to 30%. The course of the reaction may be followed, for example, by continuous determination of the refractive index or from the reduction in the NCO value.

The trimerization reaction is terminated by suitable catalyst poisons such as, for example, organic acids and acid chlorides which deactivate the catalysts used in accordance with the invention, for example sulfonic acids, such as for example benzene or toluene sulfonic acids or chlorides thereof, or acidic esters of phosphorus acid or phosphoric acid, such as for example dibutyl phosphite, dibutyl phosphate or di-(2-ethylhexyl)-phosphate. The deactivators mentioned by way of example, which react chemically with the catalysts and deactivate them, are generally added to the reaction mixture in quantities which are at least equivalent to the catalyst. However, since the catalysts are partly deactivated during the trimerization reaction, it is often sufficient to add a less than equivalent quantity of the deactivator.

The polyisocyanate mixtures according to the invention may of course be blocked in a known manner with suitable blocking agents for isocyanate groups, such as for example phenol, ε-caprolactam, malonic acid diethyl ester or acetoacetic acid ethyl ester.

The polyisocyanate mixtures according to the invention or their derivatives obtained by the blocking reaction mentioned are valuable starting materials for the production of polyurethane plastics by the isocyanate polyaddition process.

The polyisocyanate mixtures according to the invention are preferably used for the production of polyurethane foams and, more particularly, for the production of substantially closed-cell rigid foams containing urethane, urea, biuret and isocyanurate groups and, most preferably, for the production of corresponding water-blown, CFC-free rigid foams.

The production of water-blown rigid foams containing urethane, urea, biuret and isocyanurate gourds is described, for example, in DE-OS 3,910,100. Starting with polyisocyanates with no isocyanurate components as the second foaming component, and using trimerization catalysts, a rigid foam containing isocyanurate groups is produced. However, the disadvantages of this procedure are:

a) The short reaction time for isocyanurate formation during foaming makes reproducibility difficult.

b) The effects of additional heat from the isocyanurate-forming reaction during foaming is an obstacle to controlled foam formation, in the case of water-blown CFC-free rigid foams.

These disadvantages are overcome by the use of the isocyanurate polyisocyanate mixtures according to the invention. As can be seen from the corresponding comparative foaming examples, the advantage of this invention is reflected in particular in the improved compressive strength of the resulting rigid foams. The invention is illustrated by the following Examples.

EXAMPLES

DESCRIPTION OF THE TESTS

A) Trimerization Examples

Starting products

Catalyst A:

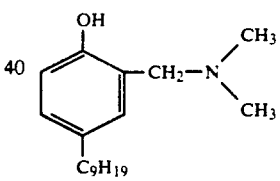

(according to DAS 2,551,634, Example b)

Catalyst B:

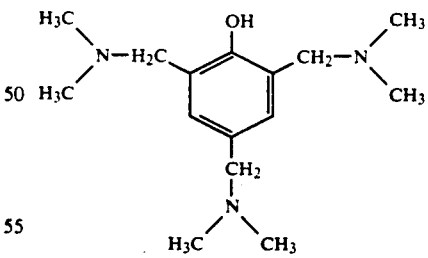

DMP 30, a product of Rohm and Haas, USA

Catalyst C:
Methyl trialkyl ($C_{8-10}$) ammonium flouride in 2-ethyl hexan-1-ol (according to DE-OS 3 827 596) $F^-$: 0.025 mmol/g Polyol 1    propylene-glycol-started polyether, OH value 28, containing 87% PO and 13% terminal EO. MW: 4010

Polyol 2    trimethylol-propan-started polyether, OH value 28, containing 86% PO and 14% terminal EO. MW: 6010

Isocyanate mixture 1

56% by weight 4,4' MDI      NCO content: 32.4%
29% by weight 2,4' MDI
5% by weight 2,2' MDI
10% by weight polymeric MDI -continued

| Starting products | |
|---|---|
| Isocyanate mixture 2 | |
| 46–47% by weight 4,4' MDI | NCO content: 33.3% |
| 52–53% by weight 2,4' MDI | |
| <1% by weight 2,2' MDI | |
| Isocyanate mixture 3 | |
| 59% by weight 4,4' MDI | NCO content: 32.2% |
| 23% by weight 2,4' MDI | |
| 3% by weight 2,2' MDI | |
| 15% by weight polymeric MDI | |

EXAMPLE 1

3.8 kg isocyanate mixture 1 and 200 g polyol 1 are heated with stirring under nitrogen to 60° C., followed by the addition of 6 g catalyst A.

After approx. 5.5 hours, the refractive index $n_D^{23°C}$ has increased to 16111, corresponding an NCO reduction to 26.2%. The trimerization is then terminated by addition of 4.6 g phosphoric acid dibutyl ester. A liquid polyisocyanate mixture having the following characteristic data is obtained:

| | |
|---|---|
| NCO: 26.2% | Degree of trimerization: 14% |
| Viscosity (23° C.): 1000 mPa · s | Degree of urethanization: 5% |

EXAMPLE 2

1.9 kg isocyanate mixture 1 are reacted with 3.5 g catalyst A at 60° C.

After about 1.5 hours, the refractive index $n_D^{23°C}$ has increased to 1.6205, corresponding to an NCO reduction to 27.3%. After termination with 3 g phosphoric acid dibutyl ester, a liquid polyisocyanate mixture having the following characteristic data is obtained:

| | |
|---|---|
| NCO: 27.7% | Degree of trimerization: 15.7% |
| Viscosity (23° C.): 900 mPa · s | |

Examples 3 to 10, which are based on the same procedure, are set out in Table 1 below.

mixture 1. After about 4 hours at 55° C., the refractive index $n_D^{23°C}$ has increased to 16,108, corresponding to an NCO reduction to 26.6%. The trimerization is then terminated by addition of 4.6 g phosphoric acid dibutyl ester. A liquid polyisocyanate mixture having the following characteristic data is obtained:

| | |
|---|---|
| NCO: 26.6% | Degree of trimerization: 12.4% |
| Viscosity/23° C.: 900 mPa · s | Degree of urethanization: 5%. |

Table 2 below lists foam formulations using the liquid polyisocyanate mixtures according to the invention (Examples 1 to 3). Example 4 from DE 3 910 100 is included for comparison. The production of the CFC-free rigid foams obtained is carried out by methods known se.

Table 3 demonstrates the relative improvement in compressive strength in the foaming direction and perpendicularly to the foaming direction.

TABLE 2

| | Examples | | | Comparison Examples Example 4 of |
|---|---|---|---|---|
| | 1 | 2 | 3 | DE 3,910,100 |
| Flexible foam polyether 1* | 35.6 | 30.5 | 33.8 | 41.4 |
| Rigid foam polyester 1* | 7.1 | 6.0 | 6.7 | 8.2 |
| Rigid foam polyether 2* | 7.1 | 6.0 | 6.7 | 8.2 |
| Flameproofing agent 1* | 12.0 | 10.3 | 11.4 | 13.9 |
| Flameproofing agent 2* | 12.0 | 10.3 | 11.4 | 13.9 |
| Water* | 2.9 | 2.9 | 2.9 | 2.9 |
| Polyether siloxane* | 2.4 | 2.1 | 2.3 | 2.8 |
| Catalyst 1* | 2.7 | 2.3 | 2.5 | 3.1 |
| Polyisocyante 2* | — | — | — | 170.4 |
| Polyisocyante A* | 183.4 | — | — | — |
| Polyisocyante B* | — | 194.5 | — | — |
| Polyisocyante C* | — | — | 187.4 | — |
| NCO Index | 230 | 230 | 230 | 230 |
| Cream time (s) | 5 | 5 | 5 | 5 |
| Gel time (s) | 13 | 17 | 15 | 10 |
| Rise time (s) | 57 | 95 | 67 | 41 |
| Density (kg/m³) | 42 | 48 | 42 | 40 |

*Quantity in parts by weight

Flexible foam polyether 1  propylene-glycol-started polyether, OH value 28, containing 87% propylene oxide

TABLE 1

| Example | 3 | 4 | 5 | 6 | 7 | 8 | 9 | 10 |
|---|---|---|---|---|---|---|---|---|
| Starting products | Isocyanate 1 (3,800 g) Polyol 2 (200 g) | Isocyanate 3 (1,900 g) Polyol 1 (100 g) | Isocyanate 3 (1,900 g) — | Isocyanate 2 (1,900 g) Polyol 1 (100 g) | Isocyanate 2 (2,000 g) — | Isocyanate 2 (2,150 g) Polyol 1 (100 g) | Isocyanate 1 (3,800 g) Polyol 2 (200 g) | Isocyanate 1 (1,900 g) Polyol 2 (100 g) |
| Trimerization | | | | | | | | |
| Catalyst | A (7.5 g) | A (3.5 g) | A (3.5 g) | B (3.9 g) | C (1.2 g) | C (1.2 g) | A (6 g) | B (4 g) |
| Temperature | 60° C. | 60° C. | 60° C. | 60° C. | 55° C. | 55° C. | 55° C. | 55° C. |
| Time | 2¼ h | 2¼ h | 2 h | 8 h | 3 h | 2 h | 5¼ h | 7¼ h |
| Stopper (acc. to Example 1) | 7 g | 3 g | 3 g | 3.1 g | 0.2 g | 0.2 g | 4.6 g | 3.2 g |
| Product data | | | | | | | | |
| NCO Content | 26.1% | 24.7% | 26.8% | 27.6% | 26.8% | 24.1% | 25.1% | 26.1% |
| Viscosity (23° C.) | 1300 mPas | 5000 mPas | 1900 mPas | 300 mPas | 1200 mPas | 10000 mPas | 3000 mPas | 1000 mPas |
| Degree of timerization | 14% | 18% | 17% | 10% | 19,5% | 22,8% | 17,3% | 14% |
| Degree of urethanization | 5% | 5,3% | — | 5% | — | 4.8% | 5% | 5% |

EXAMPLE 11

200 g polyol 2 and 6 g catalyst A are introduced over a period of 5 minutes at 50° C. into 3.8 kg of isocyanate Rigid foam polyester 1  polyester of adipic acid/phthalic acid (1:0.5) and glycerol/propylene (PO) and 13% terminal ethylene oxide (EO)

TABLE 2-continued

| | |
|---|---|
| | glycol; OH value 213 |
| Rigid foam polyester 2 | trimethylol-propane-started polypropylene oxide ether; OH value 875 |
| Flameproofing agent 1 | diphenyl methane phosphonate |
| Flameproofing agent 2 | trichloroisopropyl phosphate |
| Polyether siloxane | commercial stabilizer (B 8421, Goldschmidt AG) |
| Catalyst 1 | 25% potassium acetate in diethylene glycol |
| Polyisocyanate 2 | crude diphenyl methane diisocyante (viscosity 24° C.: ~200 mPa · s) |
| Polyisocyanate A | trimer of Example 2 according to the invention |
| Polyisocyanate B | trimer of Example 4 according to the invention |
| Polyisocyanate C | trimer of Example 11 according to the invention |

TABLE 3

Test results, compression test:

| | Compression test DIN 53 421 | |
|---|---|---|
| Examples from Table 2 | $\sigma_B^{1)}$ (mPa) | $\sigma_{10}^{2)}$ (mPa) |
| Example 1 | 0.26 | 0.11 |
| Example 2 | 0.29 | 0.17 |
| Example 3 | 0.24 | 0.10 |
| Example 4 (Comparison) | 0.21 | 0.09 |

[1)]in the foaming direction
[2)]perpendicular to the foaming direction

What is claimed is:

1. Liquid polyisocyanate mixtures containing isocyanurate groups and having an NCO content of 15% to 30% by weight obtainable by partial trimerization of the isocyanate groups of polyisocyanate mixtures of the diphenyl methane series containing 80% to 100% by weight diisocyanatodiphenyl methane isomers and 0% to 20% by weight higher than difunctional polyisocyanates of the diphenyl methane series, 40% to 80% by weight of the diisocyanatodiphenyl methane isomers consisting of 4,4'-diisocyanatodiphenyl methane, 20% to 60% by weight of 2,4'-diisocyanato diphenyl methane and 0% to 8% by weight of 2,2'-diisocyanatodiphenyl methane and the percentages shown adding up to 100.

2. Liquid polyisocyanate mixture containing isocyanurate groups as claimed in claim 1, in which 0% to 50% of the isocyanate groups reacted off have been converted into urethane groups.

3. A Process for the production of the liquid polyisocyanate mixtures claimed in claim 1, characterized in that the isocyanate groups of a polyisocyanate mixtures of the diphenyl methane series containing 80% to 100% by weight diisocyanatodiphenyl methane isomers and 0% to 20% by weight higher than difunctional polyisocyanates of the diphenyl methane series, 40% to 80% by weight of the diisocyanatodiphenyl methane isomers consisting of 4,4'-diisocyanatodiphenyl methane, 20% to 60% by weight of 2,4'-diisocyanatodiphenyl methane and 0% to 8% by weight of 2,2'-diisocyanatodiphenyl methane and the percentages shown adding up to 100 which are partly trimerized to the particular degree of trimerization required, in the presence of a trimerization-accelerating catalyst and optionally in the presence of hydroxyl-functional components and the trimerization reaction is subsequently terminated by addition of a catalyst poison.

4. A process for the production of the liquid polyisocyanate mixtures claimed in claim 2, characterized in that the isocyanate groups of a polyisocyanate mixtures of the diphenyl methane series containing 80% to 100% by weight diisocyanatodiphenyl methane isomers and 0% to 20% by weight higher than difunctional polyisocyanates of the diphenyl methane series, 40% to 80% by weight of the diisocyanatodiphenyl methane isomers consisting of 4,4'-diisocyanatodiphenyl methane, 20% to 60% by weight of 2,4'-diisocyanatodiphenyl methane and 0% to 8% by weight of 2,2'-diisocyanatodiphenyl methane and the percentages shown adding up to 100 which are partly trimerized to the particular degree of trimerization required, in the presence of a trimerization-accelerating catalyst and optionally in the presence of hydroxyl-functional components and the trimerization reaction is subsequently terminated by addition of a catalyst poison.

5. A process for the production of polyurethane foams comprising reacting the liquid polyisocyanate mixtures claimed in claim 1 with active hydrogen containing compounds in the presence of water as the blowing agent.

6. A process for the production of polyurethane foams comprising reacting the liquid polyisocyanate mixtures claimed in claim 2 with active hydrogen containing compounds in the presence of water as the blowing agent.

* * * * *